United States Patent [19]
Betcher et al.

[11] Patent Number: 5,605,207
[45] Date of Patent: Feb. 25, 1997

[54] FUEL TANK TENDER

[75] Inventors: Larry W. Betcher, Northfield; Charles L. Mosher; Scott E. Jirele, both of Owatonna, all of Minn.

[73] Assignee: OTC Div. of SPX Corporation, Owatonna, Minn.

[21] Appl. No.: 437,953

[22] Filed: May 10, 1995

[51] Int. Cl.$^6$ ...................................................... B66B 9/16
[52] U.S. Cl. .......................................... 187/244; 414/910
[58] Field of Search ................................... 187/240, 244, 187/267, 268, 274, 272, 222; 254/98, 100, 101, 93 A; 414/910, 592, 630, 631

[56] References Cited

U.S. PATENT DOCUMENTS 4,253,792  3/1981  Nishikawa ................................. 414/910

FOREIGN PATENT DOCUMENTS 1236050  6/1971  United Kingdom .................. 187/244

*Primary Examiner*—Kenneth Noland
*Attorney, Agent, or Firm*—Wood, Phillips, VanSanten, Clark & Mortimer

[57] ABSTRACT

A fuel tank tender is used for facilitating installation, removal and service of vehicle fuel tanks. The tender includes a frame. Casters rotatably mounted on the frame move the frame over a support surface, including into position beneath a fuel tank. A cradle supports a fuel tank. Elevating jacks mount the cradle to the frame for raising and lowering the cradle relative to the support surface to lift and lower or support the fuel tank relative to the vehicle.

18 Claims, 5 Drawing Sheets

FUEL TANK TENDER

FIELD OF THE INVENTION

This invention relates to a fuel tank tender particularly adapted for facilitating servicing of fuel tanks on vehicles.

BACKGROUND OF THE INVENTION

It is very difficult to service diesel fuel tanks, including internal components, particularly on Class 7 and 8 trucks, due to the size and weight of the tank. The tank is of cylindrical shape with a diameter of from 22–28 inches and a length from 23–74 inches. The tank can hold up to 100 gallons of fuel.

The most common method used by mechanics for removing or servicing diesel fuel tanks is to completely empty the fuel and then manually lift the bulky tank away from the truck frame. The method is reversed for the installation of the fuel tank. This process is very time-consuming and risks physical damage to the mechanic as well as property damage to the tank and possibly the vehicle.

Fuel tanks are frequently removed from vehicles to perform body repair, frame straightening, painting, and for replacement of internal tank components such as fuel sending units and heater elements. Steps must be taken to minimize damage in view of frequent servicing.

The present invention is directed to solving one or more of the above problems by providing a fuel tank tender for facilitating installation and removal of fuel tanks on vehicles.

SUMMARY OF THE INVENTION

In accordance with the invention there is provided a simple, efficient and cost-effective fuel tank tender for facilitating servicing of vehicle fuel tanks.

Broadly, there is disclosed herein a fuel tank tender comprising a frame. Wheel means, rotatably mounted on the frame, move the frame over a support surface, including into position beneath a fuel tank. A cradle supports a fuel tank. Elevating means mount the cradle to the frame for raising and lowering the cradle relative to the support surface to selectively support the fuel tank.

It is a feature of the invention that the frame includes telescoping means for adjusting length of the frame for various fuel tank sizes. In the exemplary embodiment of the invention, the frame is formed of telescoping tubing for adjusting length of the frame.

It is another feature of the invention that the frame comprises a plate at each of opposite ends secured together with elongate tubes. The tubes are rectangular tubes which telescope for adjusting length of the frame for various fuel tank sizes.

It is a further feature of the invention that the cradle comprises first and second cradle assemblies mounted at opposite ends of the frame. Each cradle assembly comprises an elongate support having a wheel rotatably mounted at each end thereof. The wheels support the fuel tank. The wheels comprise soft tread wheels to minimize damage to the fuel tank.

It is an additional feature of the invention that the elevating means comprises a jack assembly mounting each cradle assembly at its associated frame end. Each jack assembly comprises a bottle jack having a threaded shaft to allow height adjustment of each cradle assembly.

Further features and advantages of the invention will be apparent from the specification and the drawing.

DETAILED DESCRIPTION OF THE INVENTION

Figure 1:
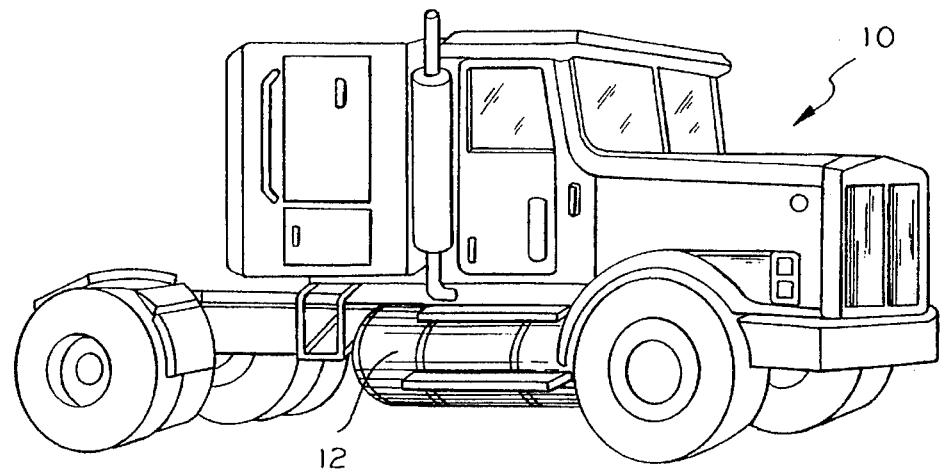
FIG. 1 is a perspective view of a truck including a cylindrical fuel tank.

Referring to FIG. 1, a vehicle in the form of a truck 10 is illustrated including a fuel tank 12. The tank 12 comprises a cylindrical fuel tank of conventional construction secured to the truck 10 by any known means. With a Class 7 or 8 truck, the tank 12 has a diameter in the range of 22–28 inches and a length in the range of 23–74 inches. The tank 12 can hold up to 100 gallons of fuel, depending on the exact size of the tank. Previously, the common method used for removing such a tank 12 is to completely empty it of fuel and then manually lift the tank 12 away from the frame of the truck 10.

Figure 2:
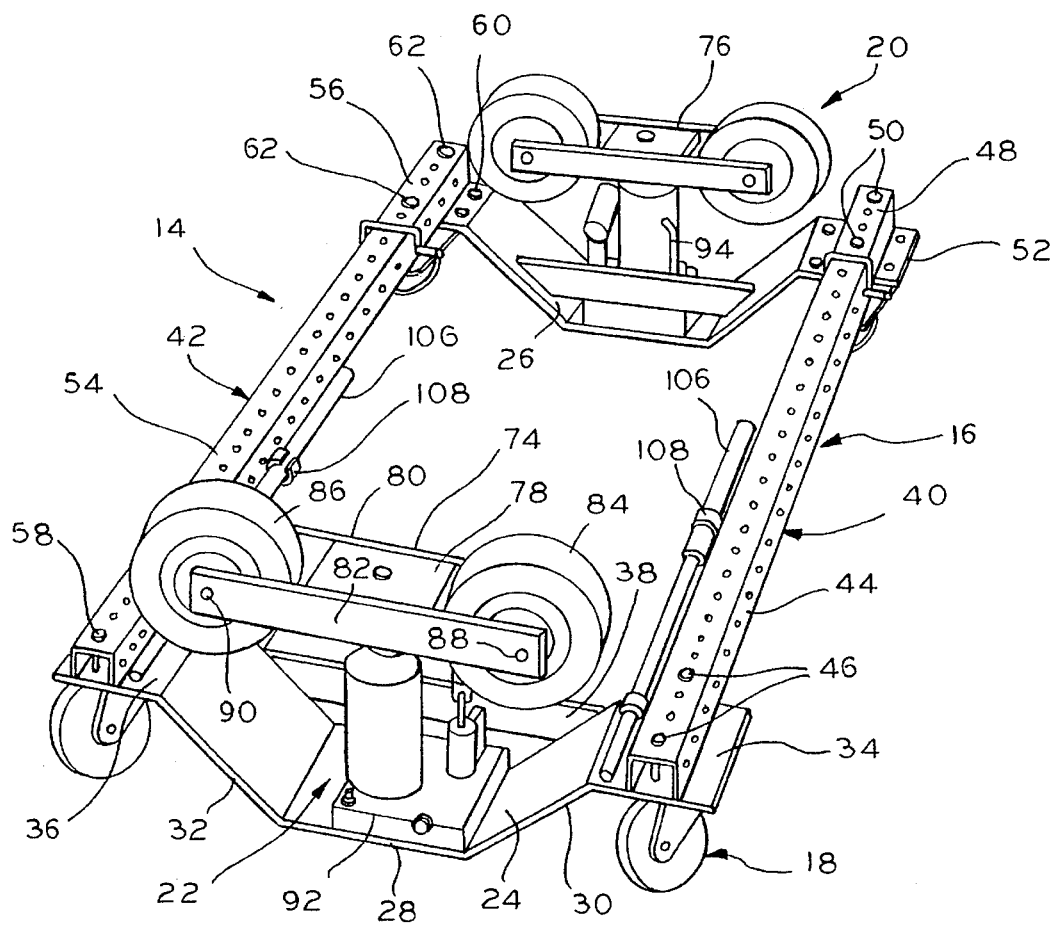
FIG. 2 is a perspective view of a fuel tank tender according to the invention for facilitating installation and removal of a vehicle fuel tank, such as the fuel tank on the truck of FIG. 1.

Referring to FIG. 2, a fuel tank tender 14 is illustrated for facilitating installation, removal and service of fuel tanks on vehicles, such as the tank 12 from the truck 10, see FIG. 1. The tender 14 comprises a frame 16, a plurality of casters 18 mounted at each corner of the frame 16 for moving the frame 16 over a support surface including into position beneath a fuel tank, a cradle 20 for supporting a fuel tank and elevating means 22 mounting the cradle 20 to the frame 16 for raising and lowering the cradle 20 relative to the support surface to lift and lower a fuel tank relative to a vehicle.

Figure 4:
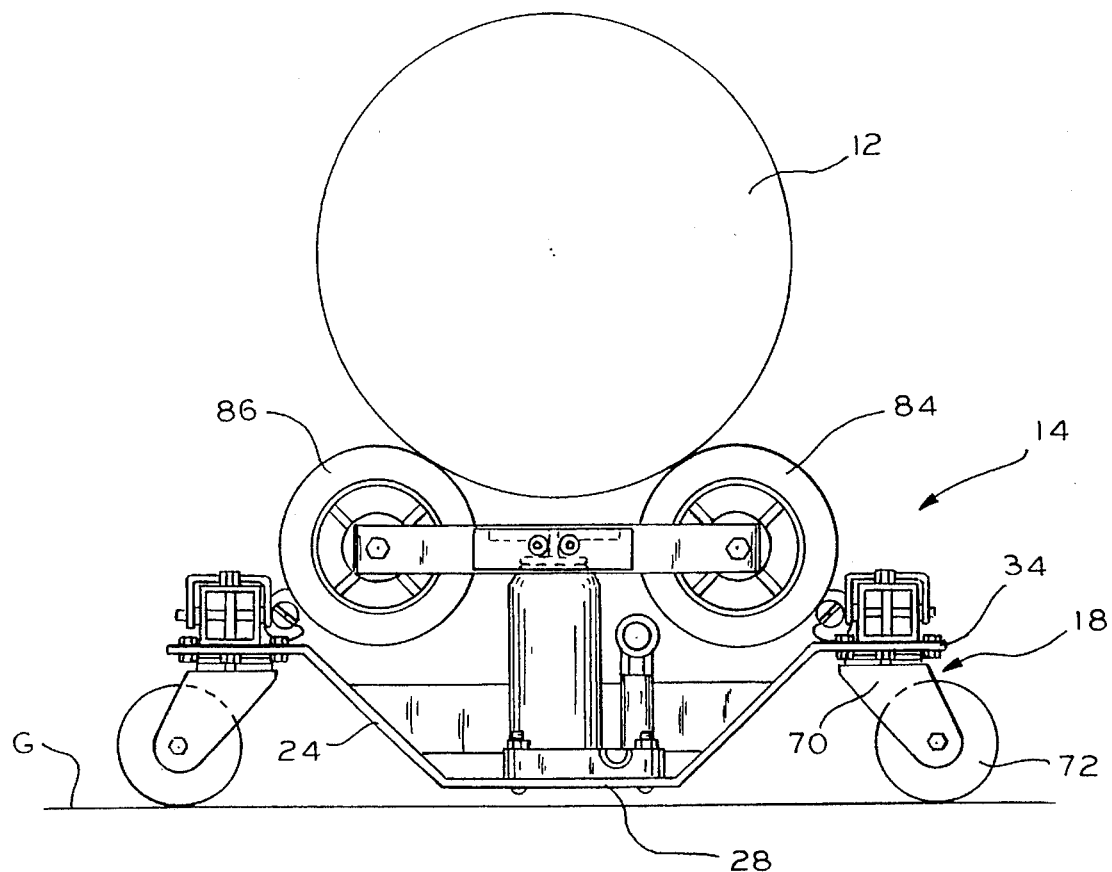
FIG. 4 is an elevation view of the fuel tank tender of FIG. 2 showing a fuel tank with a cradle in a lowered position.

The frame 16 comprises a pair of weldment plates 24 and 26 at opposite ends. As best seen in FIGS. 2 and 4, the plate 24 includes a horizontal central wall portion 28 turned at opposite ends to upwardly directed diagonal wall portions 30 and 32 which are connected at opposite ends to respective horizontal end wall portions 34 and 36. The end wall portions 34 and 36 are parallel to the central wall portion 28. A brace 38 is welded between the diagonal wall portions 30 and 32 for support. The plate 26 is of similar configuration.

The plates 24 and 26 are secured together using opposite telescoping tube assemblies 40 and 42. The telescoping tube assembly 40 includes a rectangular tube 44 bolted at one end using bolts 46 to the weldment plate first end wall portion 34. A second telescoping tube 48 is telescopically received in the first tube 44 and is bolted at an exposed end using bolts 50 to a similar first end wall portion 52 of the second weldment plate 26. The second tube assembly 42 includes a first rectangular tube 54 telescopingly receiving a smaller rectangular tube 56. One end of the tube 54 is connected to the weldment plate second end wall portion 36 using bolts 58. The second tube 56 is secured to the second weldment plate at a second wall portion 60 using bolts 62.

Figure 3:
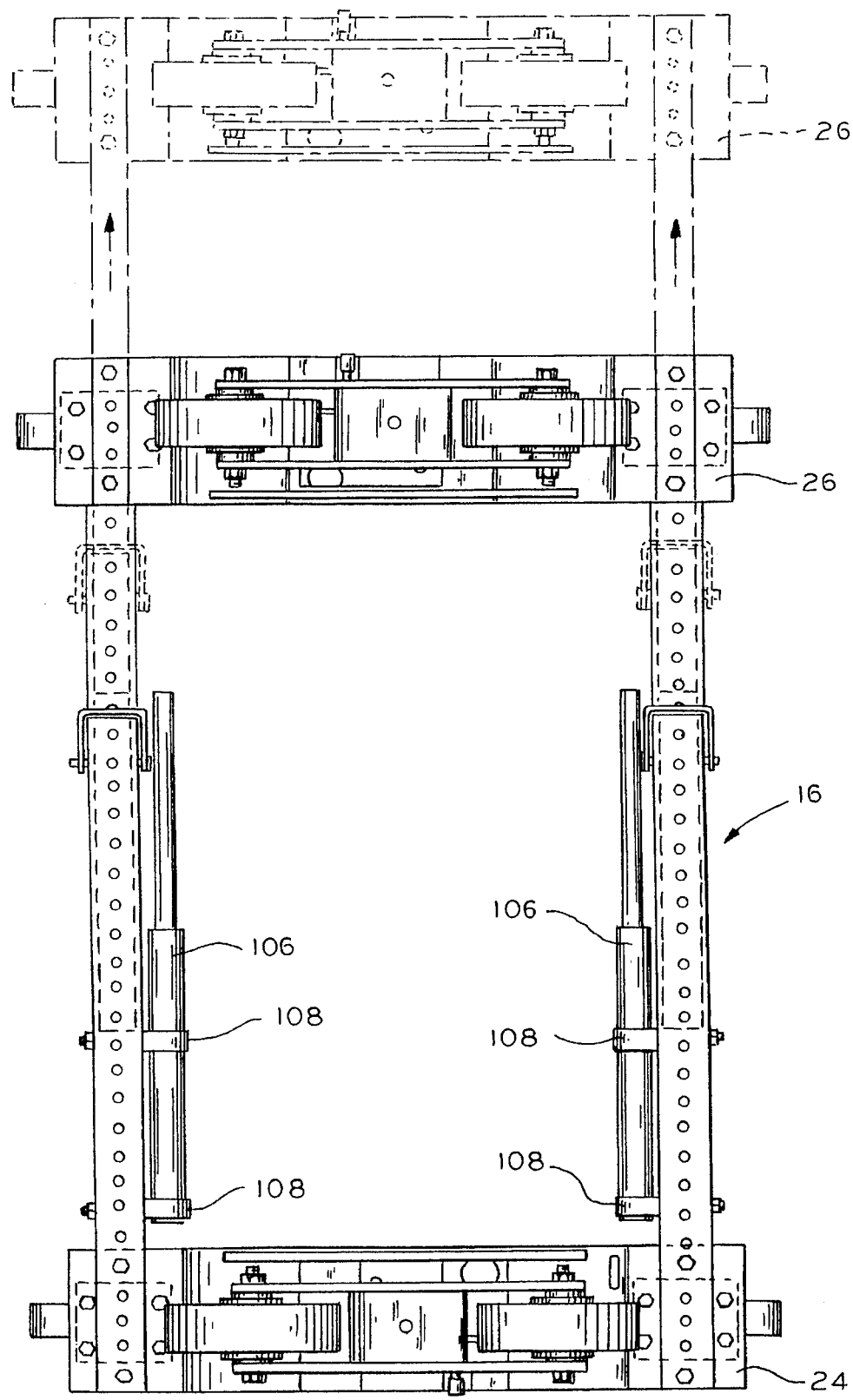
FIG. 3 is a plan view of the fuel tank tender of FIG. 2 illustrating in phantom the length adjustment feature of the invention.
Figure 5:
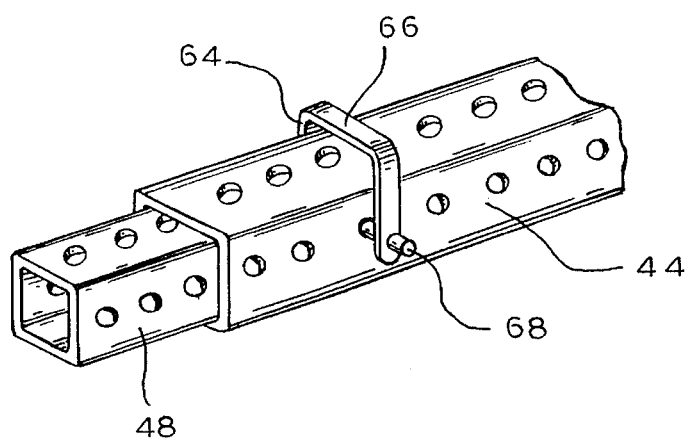
FIG. 5 is a partial perspective view illustrating the means used for adjusting length of the fuel tank tender.

As shown in FIG. 5, the tube 48 has an outer circumference of a similar shape and smaller size than an inner circumference of the first tube 44 to be slidably received therein, but with minimal slack therebetween. Each tube 44 and 48 includes a plurality of longitudinally spaced holes. The size of the frame 16 can be adjusted by suitably moving the second tube 48 relative to the first tube 44 and then locking the tubes in place using a locking assembly 64. The locking assembly 64 comprises a U-shaped bracket 66 with a locking pin 68 extending through openings at opposite ends. The locking pin 68 extends through similar aligned openings in each of the tubes 44 and 48. To select an appropriate length the tubes 44 and 48 are moved relative to one another to the desired length. Through openings are then aligned and the locking assembly 64 applied. The second locking tube assembly 42 operates similarly. Thus, the length of the frame 16 can be adjusted, as generally illustrated in solid line and phantom in FIG. 3 showing the frame 16 with two different lengths.

Each caster 18 comprises a bracket 70 secured to an underside at one of the weldment plate end portions, such as the end portion 34, see FIG. 4, with a wheel 72 rotatably mounted thereto. As such, the casters 18 mount the frame 16 such that the weldment plate central portion 28 is spaced a short distance above a support surface, such as ground G, as shown in FIG. 4.

The cradle 20 comprises first and second cradle assemblies 74 and 76. Each cradle assembly 74 and 76 is generally similar in construction. Only the first cradle assembly 74 is described in detail.

The first cradle assembly 74 comprises a rectangular carbon steel block 78 welded to parallel support bars 80 and 82. First and second wheels 84 and 86 are rotatably mounted to opposite ends of the support bars 80 and 82 using axle bolts 88 and 90, respectively. The wheels 84 comprise soft tread six inch diameter wheels.

Figure 6:
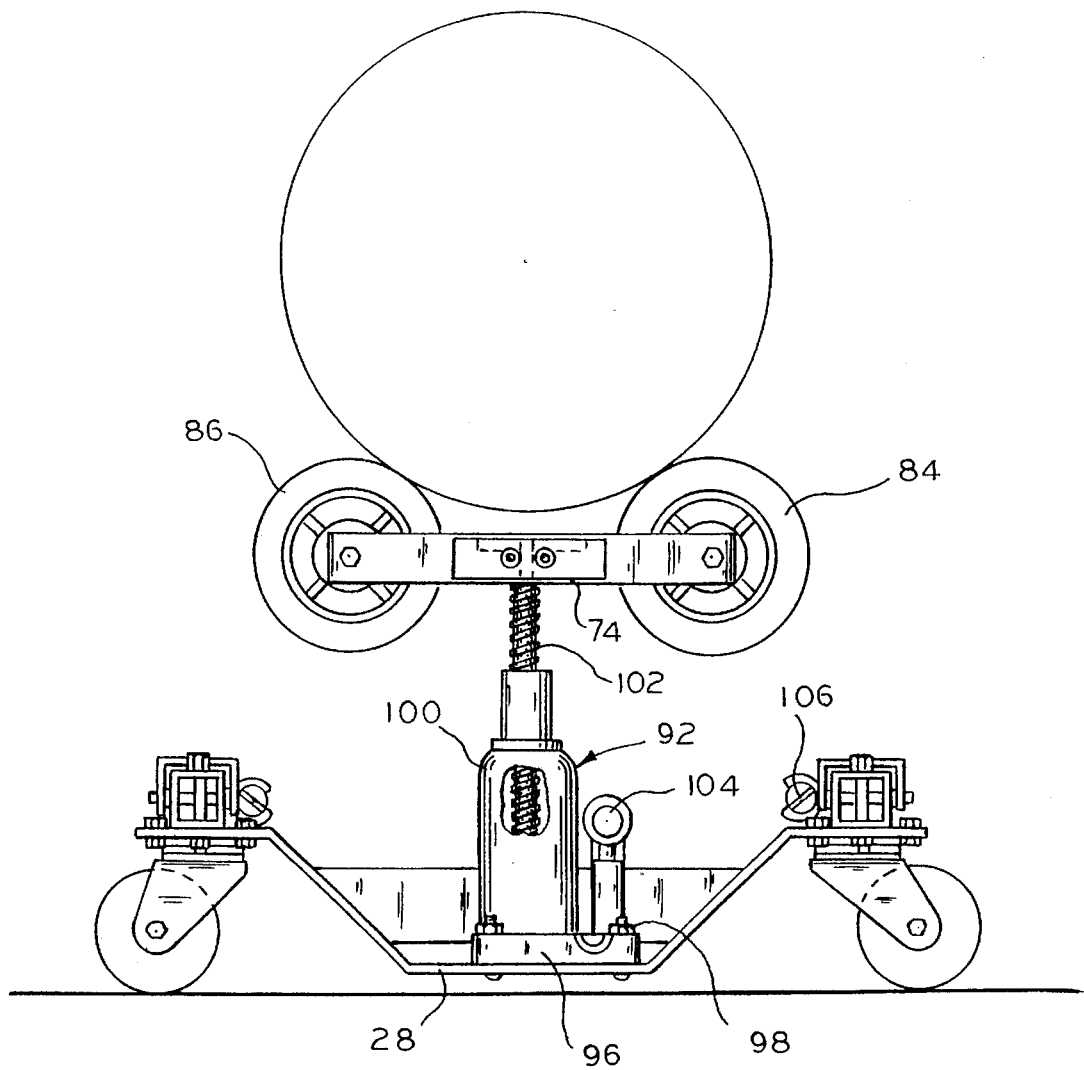
FIG. 6 is a view similar to that of FIG. 4 illustrating the cradle assembly in a raised position.

The elevating means comprises first and second bottle jack assemblies 92 and 94. The first bottle jack assembly 92 mounts the first cradle assembly 74 to the first weldment plate 24. The second bottle jack assembly 94 mounts the second cradle assembly 76 to the second weldment plate 26. Each bottle jack assembly 92 and 94 is of conventional construction. As illustrated in FIG. 6, the bottle jack assembly 92 comprises a plate 96 secured to the first weldment plate central portion 28 using bolts 98 and supporting a bottle jack 100 having a threaded shaft 102 mounted therein. The first cradle assembly 74 is mounted atop the shaft 102. The vertical position of the shaft 102 can be adjusted by operating a jack 104 using a jack handle 106. The jack handle 106 is shown stowed on the frame 16 using clips 108. Additionally, the shaft 102 can be height adjusted by rotating the shaft 102 as by turning the cradle assembly 74 owing to the use of the threaded shaft 102, as is well known.

In use, the fuel tank tender 14 is moved over a support surface into position beneath a fuel tank, such as the tank 12 on the truck 10 of FIG. 1. The cradle assemblies 74 and 76 can then be independently raised using the bottle jack assemblies 92 and 94 to a raised position, shown in FIG. 6, with the wheels 84 and 86 supporting the tank 12. The tank can then be removed and the cradle assemblies 74 and 76 lowered by using the jack assemblies 92 and 94 in the conventional manner to a lowered position, as shown in FIG. 4. The fuel tank tender 14 can then be rolled along the ground away from the truck to allow for servicing of the tank 12.

Figure 7:
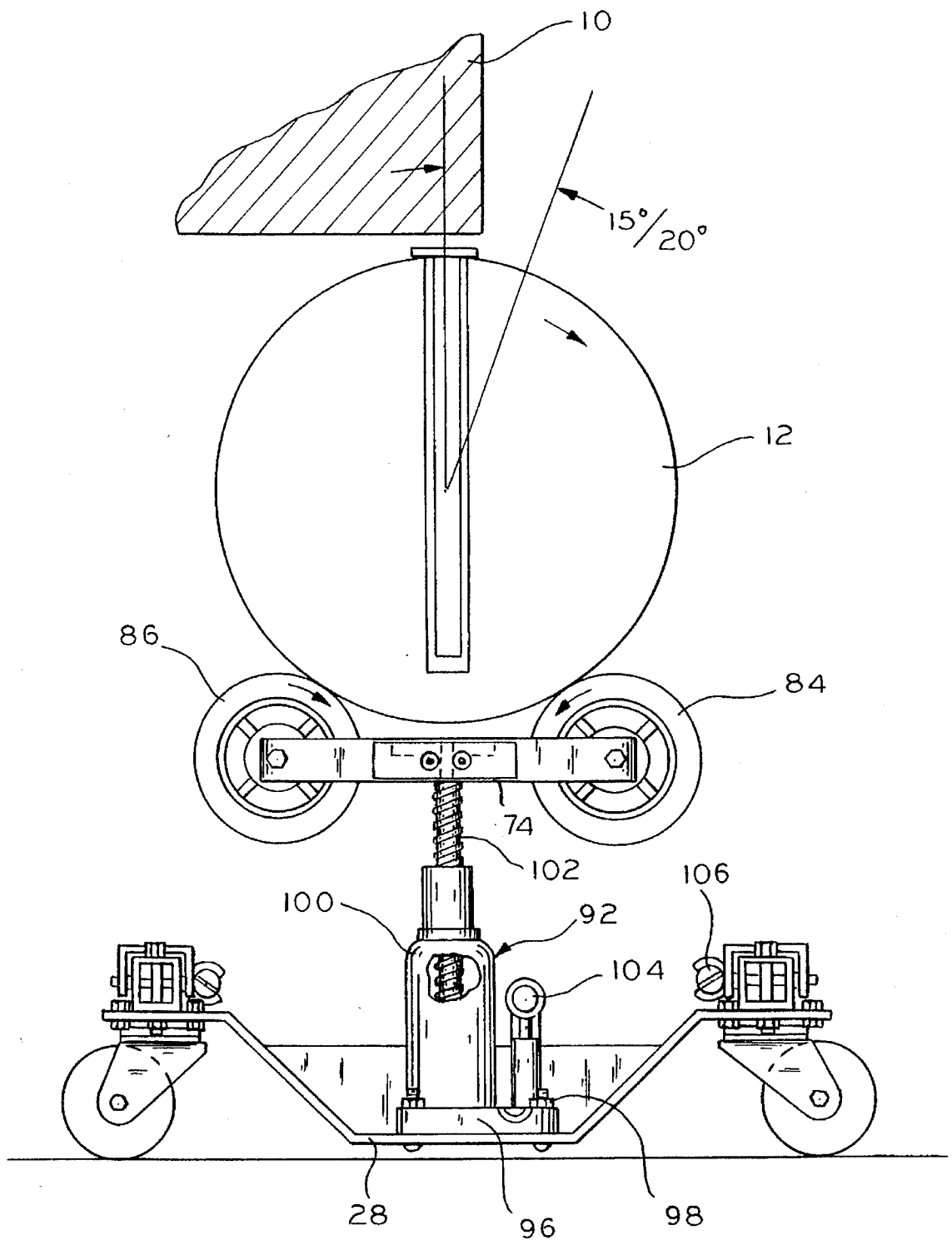
FIG. 7 is a view similar to FIG. 6 illustrating rotation of the fuel tank for servicing internal components.

The tender 14 having the wheeled casters 18 allows for ease of transport. The telescoping tube allows for adjusting length of the frame 16 for various tank sizes. The tube assemblies 40 and 42 also provide stable base for support. The bottle jack assemblies 92 and 94 at each end allow the tender 14 to lift and support tanks which are not mounted parallel to the ground. Since the cradle assemblies 74 and 76 are mounted on the lifting rams or threaded shaft of the bottle jack assemblies 92 and 94, using the threaded shaft, allows for height adjustment. The use of soft tread wheels 84 and 86 allows the tender 14 to lift the tank in a stable manner and prevent scratching, denting, or other damage to the vehicle tank. Finally, the cradle assembly 74 and 76 using wheels 84 and 86 at lift points allows the operator to rotate the tank for service of internal tank components without completely removing the tank from the vehicle. This feature is illustrated in FIG. 7. Particularly, when the tank 12 is rotated approximately fifteen to twenty degrees internal tank components, such as a sending unit or heating element, 110 can be replaced without complete removal of the tank 12 from the vehicle 10. Normally, the truck cab is located over fuel tank access ports.

We claim:

1. A fuel tank tender for facilitating servicing of fuel tanks on vehicles, comprising:

a frame including telescoping means for adjusting length of the frame for various fuel tank sizes;

wheel means rotatably mounted on the frame for moving the frame over a support surface including into position beneath a fuel tank;

a cradle for supporting a fuel tank; and elevating means mounting the cradle to the frame for raising and lowering the cradle relative to the support surface to support the fuel tank.

2. The fuel tank tender of claim 1 wherein said frame is formed of telescoping tubing for adjusting length of the frame.

3. A fuel tank tender for facilitating servicing of fuel tanks on vehicles comprising:

a frame comprising a plate at each of opposite ends secured together with elongate tubes;

wheel means rotatably mounted on the frame for moving the frame over a support surface including into position beneath a fuel tank;

a cradle for supporting a fuel tank; and elevating means mounting the cradle to the frame for raising and lowering the cradle relative to the support surface to Support the fuel tank.

4. The fuel tank tender of claim 3 wherein said tubes are rectangular tubes.

5. The fuel tank tender of claim 3 wherein said tubes are telescoping for adjusting length of the frame for various fuel tank sizes.

6. The fuel tank tender of claim 1 wherein the cradle comprises first and second cradle assemblies mounted at opposite ends of the frame.

7. The fuel tank tender of claim 6 wherein each said cradle assembly comprises an elongate support having a wheel rotatably mounted at each end thereof, the wheels supporting the fuel tank.

8. The fuel tank tender of claim 7 wherein said wheels comprise soft tread wheels.

9. The fuel tank tender of claim 6 wherein the elevating means comprises a jack assembly mounting each cradle assembly at its associated frame end.

10. A fuel tank tender for facilitating servicing of fuel tanks on vehicles, comprising:

a frame;

wheel means rotatably mounted on the frame for moving the frame over a support surface including into position beneath a fuel tank;

a cradle for supporting a fuel tank comprising first and second cradle assemblies mounted at opposite ends of the frame; and elevating means mounting the cradle to the frame for rasing and lowering the cradle relative to the support surface to support the fuel tank, wherein the elevating means comprises a jack assembly mounting each cradle assembly at its associated frame end, and each said jack assembly comprising a bottle jack having a threaded shaft to allow height adjustment of each cradle assembly.

11. A fuel tank tender for facilitating servicing of cylindrical fuel tanks on vehicles, comprising:

an elongate frame including telescoping means for adjusting length of the frame for various fuel tank sizes;

wheel means rotatably mounted on the frame for moving the frame over a support surface including into position beneath a fuel tank;

a pair of cradle assemblies for supporting a fuel tank; and elevating means mounting each cradle assembly to respective opposite ends of the frame for independently raising and lowering the cradle assemblies relative to the support surface to support the fuel tank.

12. The fuel tank tender of claim 11 wherein said frame comprises a plate at each of opposite ends secured together with elongate tubes.

13. The fuel tank tender of claim 12 wherein said tubes are rectangular tubes.

14. The fuel tank tender of claim 12 wherein said tubes are telescoping for adjusting length of the frame for various fuel tank sizes.

15. The fuel tank tender of claim 11 wherein each said cradle assembly comprises an elongate support having a wheel rotatably mounted at each end thereof, the wheels supporting the fuel tank.

16. The fuel tank tender of claim 15 wherein said wheels comprise soft tread wheels.

17. The fuel tank tender of claim 11 wherein the elevating means comprises a jack assembly mounting each cradle assembly at its associated frame end.

18. A fuel tank tender for facilitating servicing of cylindrical fuel tanks on vehicles, comprising:

an elongate frame;

wheel means rotatably mounted on the frame for moving the frame over a support surface including into position beneath a fuel tank;

a pair of cradle assemblies for supporting a fuel tank; and elevating means mounting each cradle assembly to respective opposite ends of the frame for independently raising and lowering the cradle assemblies relative to the support surface to support the fuel tank, wherein the elevating means comprises a jack assembly mounting each cradle assembly at its associated frame end, each said jack assembly comprising a bottle jack having a threaded shaft to allow height adjustment of each cradle assembly.

* * * * *